April 21, 1964 N. C. NITSCHKE ETAL 3,130,032
APPARATUS FOR HEAT TREATING GLASS
Filed Sept. 30, 1958 8 Sheets-Sheet 4
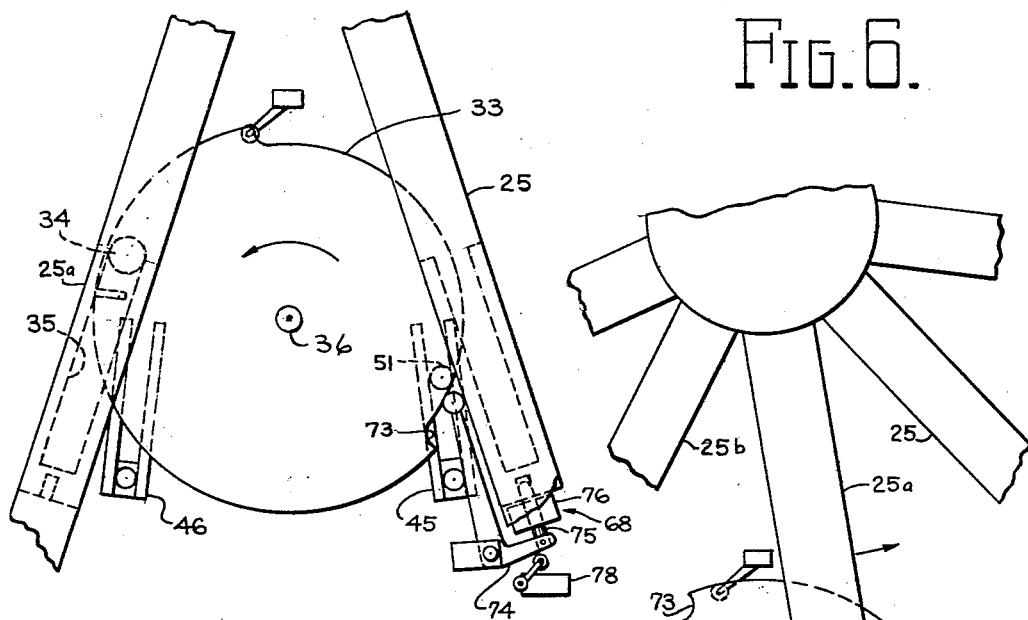
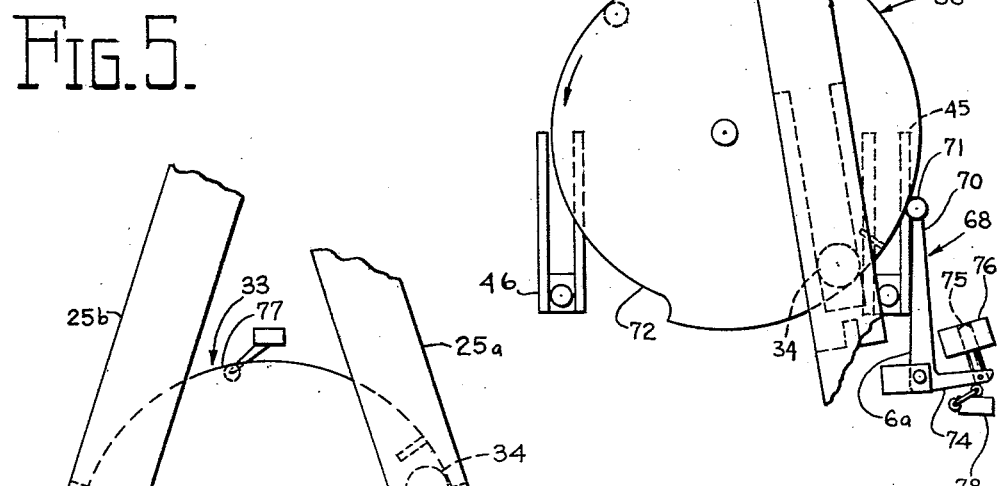
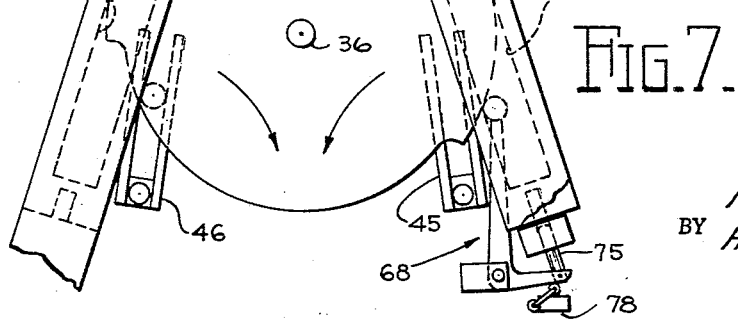
INVENTORS
Norman C. Nitschke
BY Harold A. McMaster
Owen & Owen
ATTORNEYS

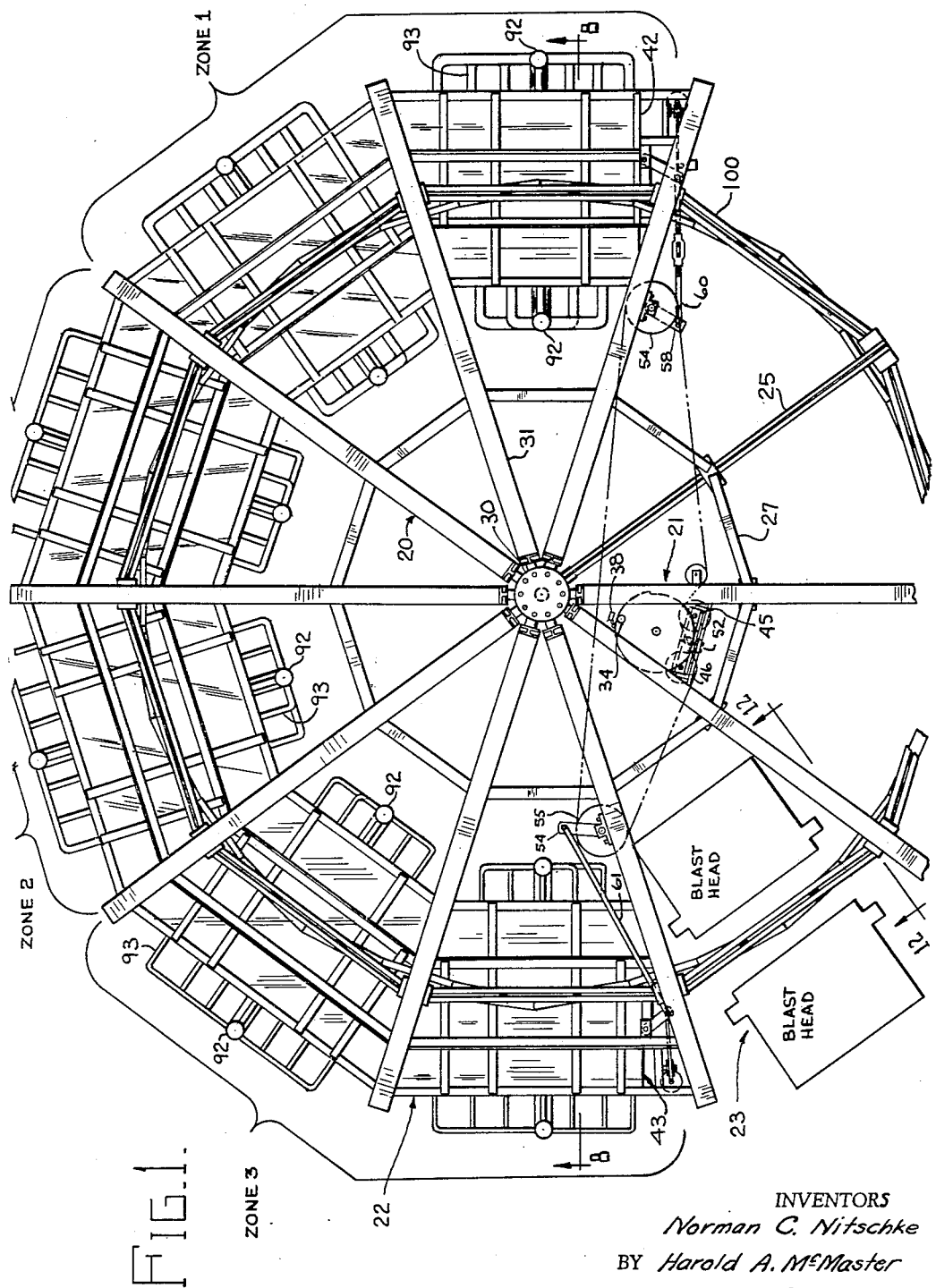

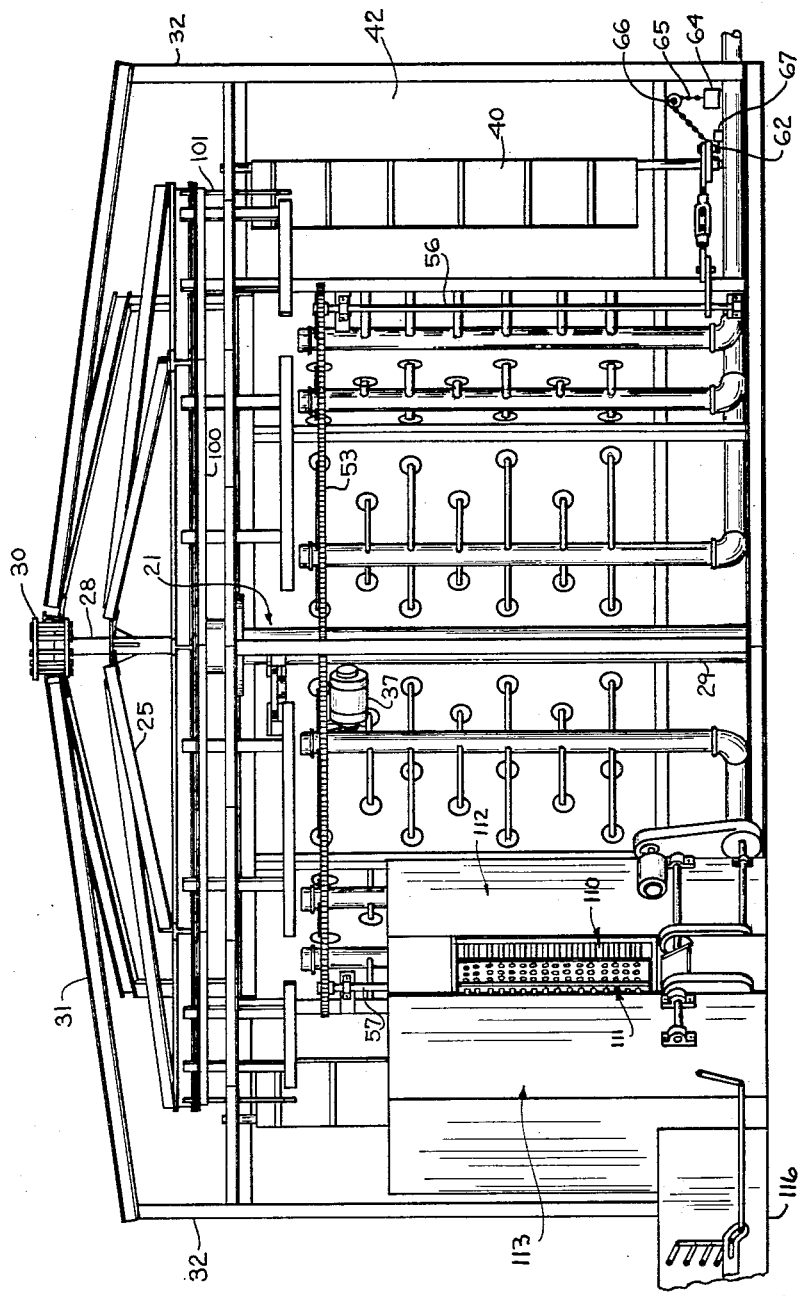

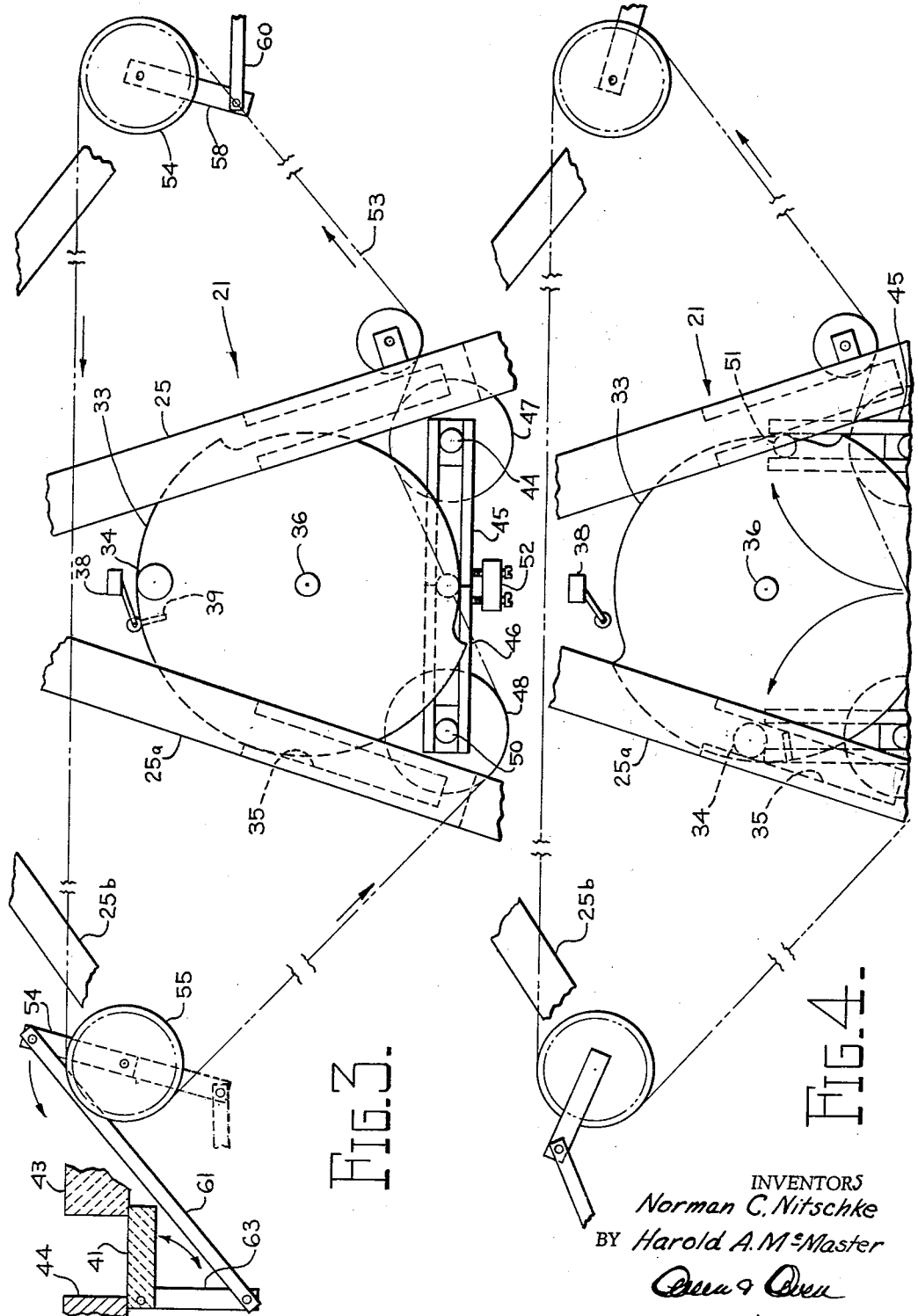

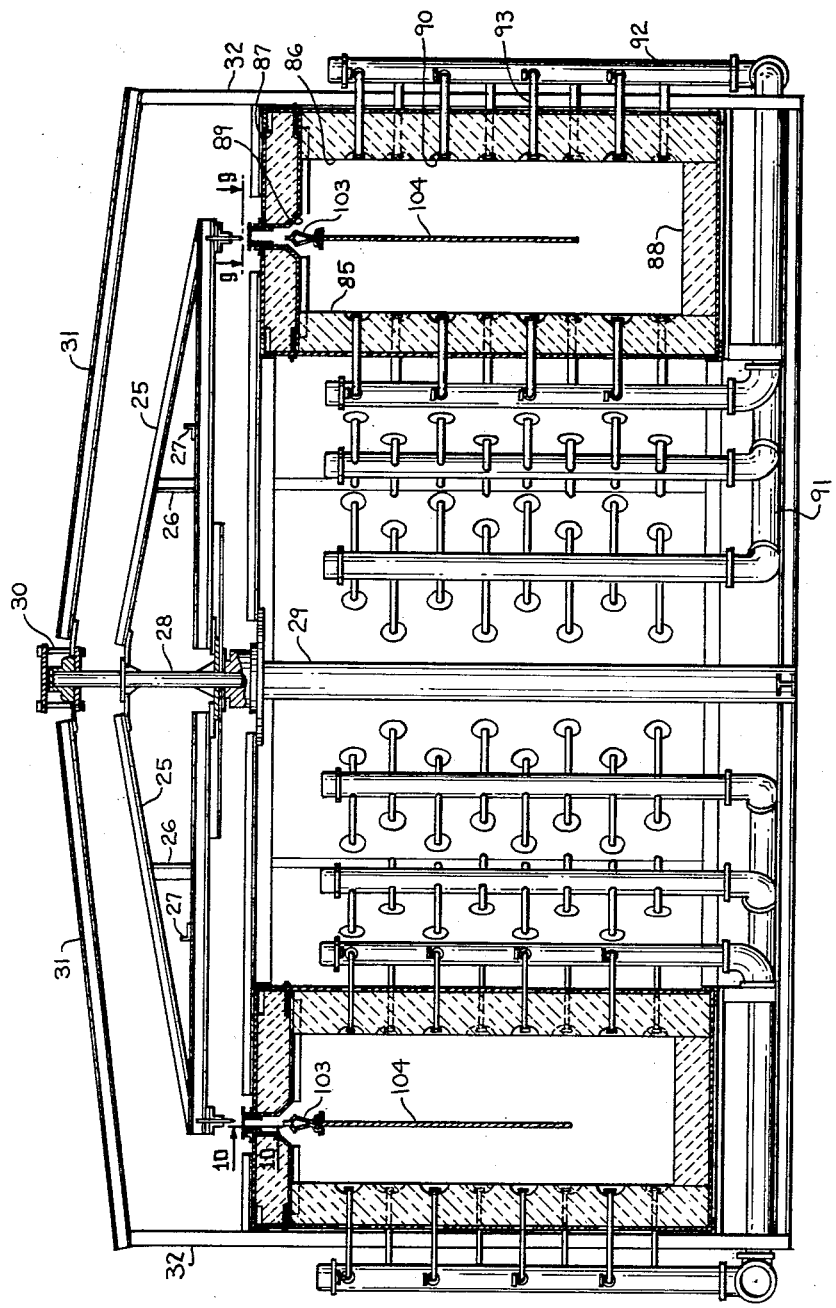

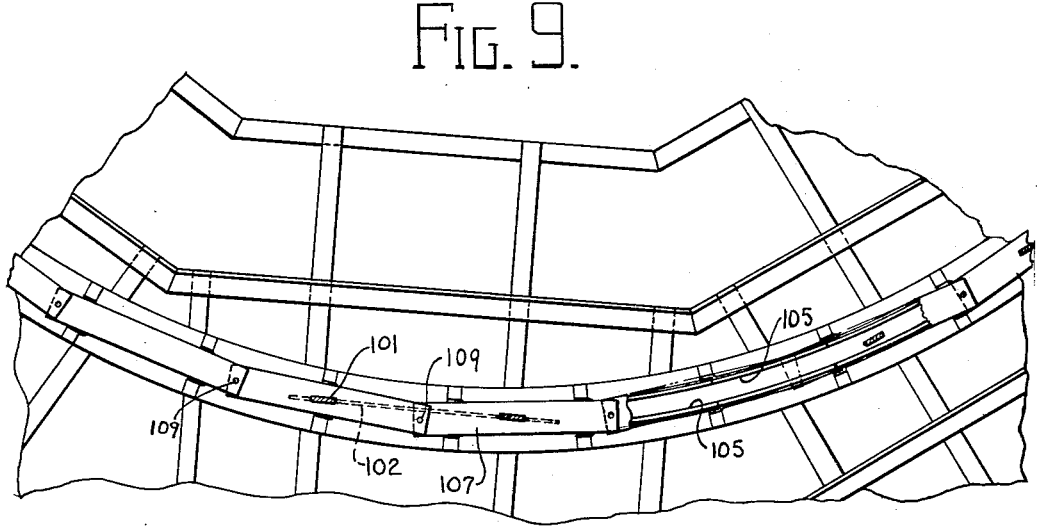
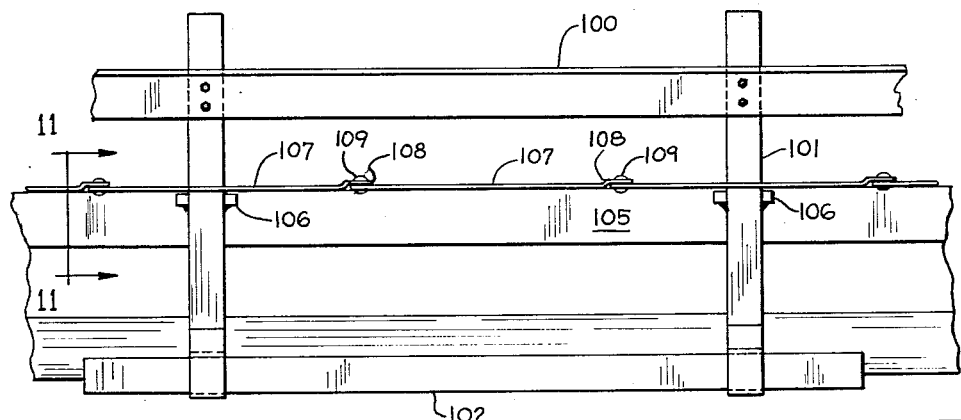
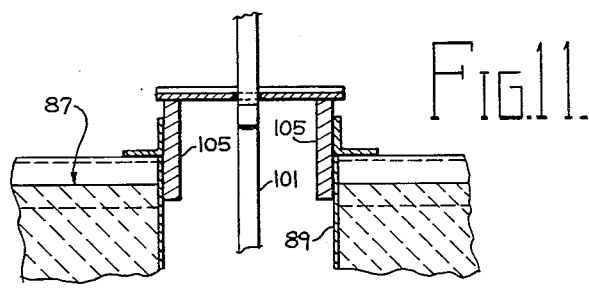
INVENTORS
Norman C. Nitschke
BY Harold A. McMaster
Owen & Owen
ATTORNEYS

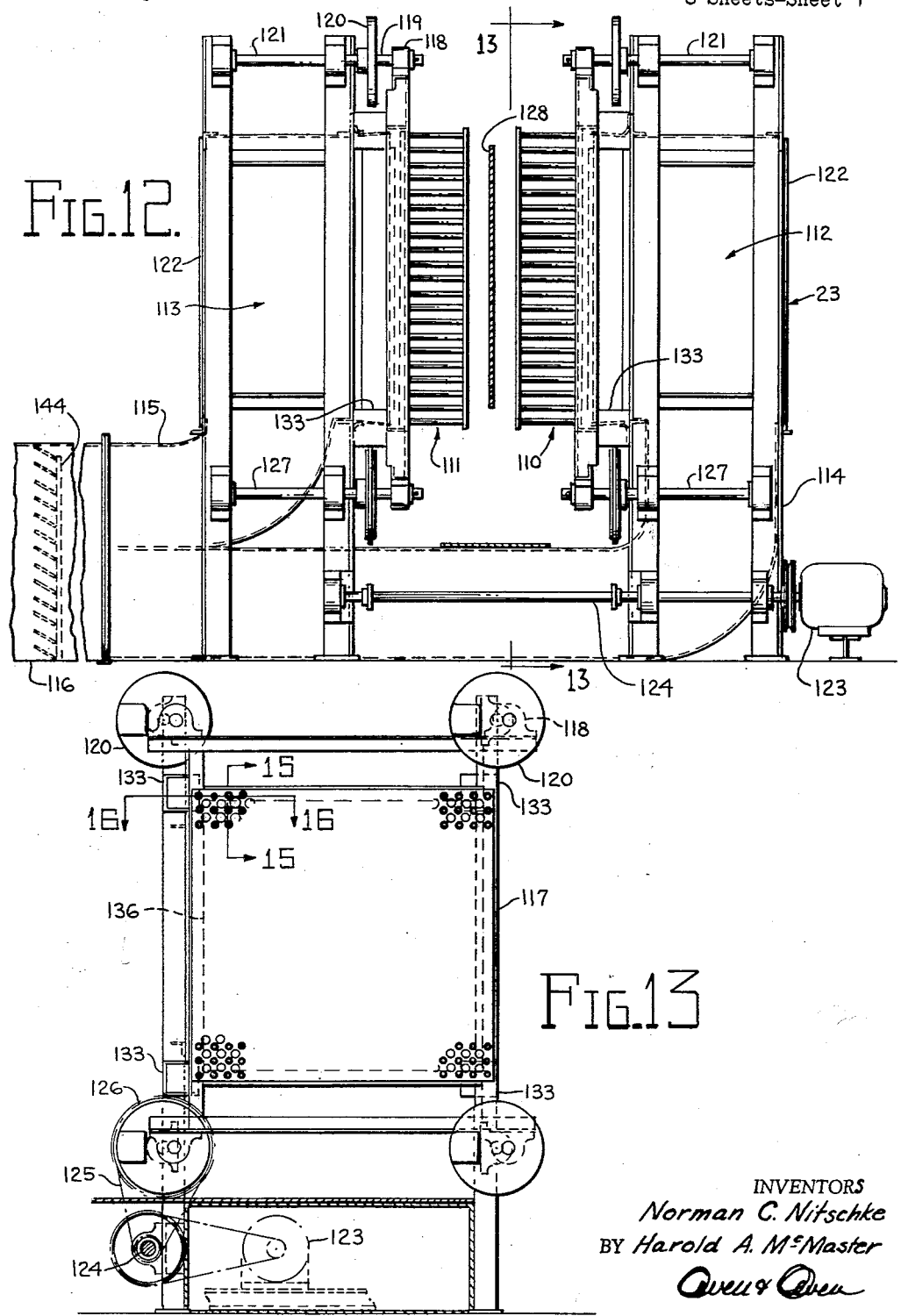

INVENTORS
Norman C. Nitschke
BY Harold A. McMaster

ATTORNEYS

United States Patent Office 3,130,032
Patented Apr. 21, 1964

3,130,032
APPARATUS FOR HEAT TREATING GLASS
Norman C. Nitschke, Perrysburg, and Harold A. McMaster, Woodville, Ohio, assignors to Permaglass, Inc., Woodville, Ohio, a corporation of Ohio
Filed Sept. 30, 1958, Ser. No. 764,347
7 Claims. (Cl. 65—349)

This invention relates to an apparatus for heat treating glass, and more particularly to an automatically controlled apparatus having a generally circular arrangement and including a heat treating furnace of toroidal shape through which the glass sheets to be treated are moved in successive steps by an intermittently actuated rotary glass carrying mechanism.

The apparatus includes not only the furnace itself but also the rotary spider-like mechanism which supports and conveys the sheets of glass, blast head mechanisms, which are positioned at the exit end of the furnace chamber, drive mechanism for intermittently producing rotative movement of the spider and thus transporting each sheet of glass from position to position within the furnace chamber and into and out of the blast head area, and other controls and mechanisms by which the operations of heating and chilling glass sheets is made automatic. The furnace chamber of an apparatus embodying the invention extends circumferentially substantially less than 360° and may be described as being of substantially toroidal shape with a segment removed. In the open space thus left, the apparatus of the invention includes the blast heads and an operator's position where treated glass sheets may be removed from the glass carrying means and untreated glass sheets positioned thereon.

The heat treating and tempering of glass plates is an art which has been practiced for some time and its process phases are well understood in the art. The apparatus embodying the invention constitutes, therefore, an improvement in apparatus designed for the practice of the glass tempering art and its assembly, subassemblies and operative mechanisms are combined according to the invention to achieve simplicity and high production of glass sheets wherein large numbers of identical sheets are to be produced, for example, for use as automotive glass, front glasses for television receivers, and the like.

It is, therefore, the principal object of this invention to provide an apparatus for automatically subjecting individual glass sheets to successive treatment steps for the tempering of such sheets at high speed and with repetitive controls so arranged that each successive sheet is subjected to the identical series of treatment steps, the apparatus including control means and actuating means for achieving automatic operation and providing for the loading and unloading of glass sheets to be treated and glass sheets after treatment.

This principal object and an apparatus embodying the invention will be better understood from the specification which follows and by reference to the drawings, in which—

FIG. 1 is a fragmentary plan view, on a small scale, of an apparatus embodying the invention;

FIG. 2 is a front view in elevation of the apparatus shown in FIG. 1, taken from a position approximately at the bottom of FIG. 1 and showing the open section of the torus wherein an operator is stationed to load and unload the apparatus;

FIG. 3 is a fragmentary, somewhat diagrammatic view of intermittent drive mechanism and furnace door opening and closing mechanism for automatically operating apparatus embodying the invention; the drive mechanism being shown at rest position between successive intermittent rotative movements and with the furnace doors closed;

FIG. 4 is a view similar to FIG. 3, but showing the apparatus during rotative movement and with the furnace doors open;

FIG. 5 is a fragmentary, diagrammatic view showing a part of the mechanism illustrated in FIGS. 3 and 4 in an intermediate position;

FIG. 6 is a view similar to FIG. 5, but showing the apparatus in a further progressed position;

FIG. 7 is a view similar to FIGS. 5 and 6, but showing the apparatus in a position further progressed from that of FIG. 6;

FIG. 8 is a transverse, vertical, sectional view, taken generally along hte line 8—8 of FIG. 1;

FIG. 9 is a fragmentary, horizontal view on an enlarged scale, taken from the position indicated by the line 9—9 in FIG. 8;

FIG. 10 is a fragmentary, vertical, sectional view, taken along the line 10—10 of FIG. 8, and shown on a greatly enlarged scale;

FIG. 11 is a fragmentary, vertical, sectional view, taken along the line 11—11 of FIG. 10;

FIG. 12 is a fragmentary view in elevation, taken generally from the position indicated by the line 12—12 of FIG. 1 and shown on a greatly enlarged scale;

FIG. 13 is a view in elevation, taken from the position indicated by line 13—13 of FIG. 12;

Figure 14:
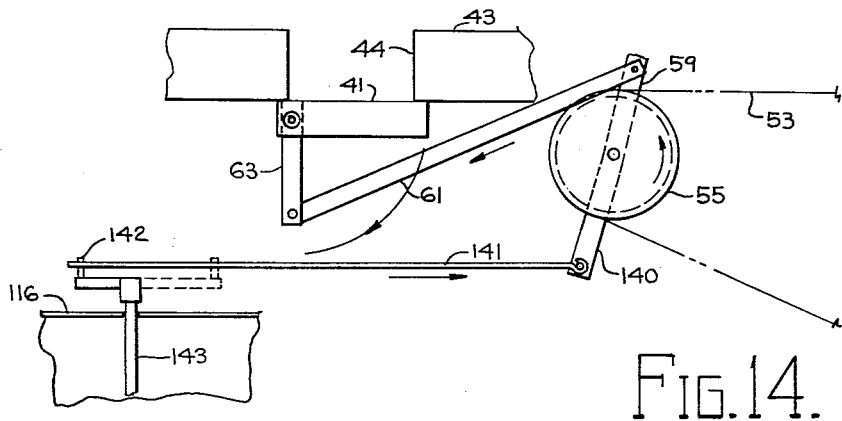
FIG. 14 is a fragmentary, diagrammatic view showing the portion of the furnace door mechanism and its linkage to air control mechanism for the blast heads illustrated in FIGS. 12 and 13.
Figure 15:
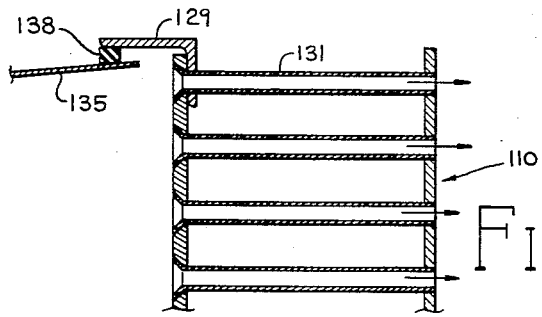
FIG. 15 is a greatly enlarged, fragmentary, vertical, sectional view, taken along the line 15—15 of FIG. 13.
Figure 16:
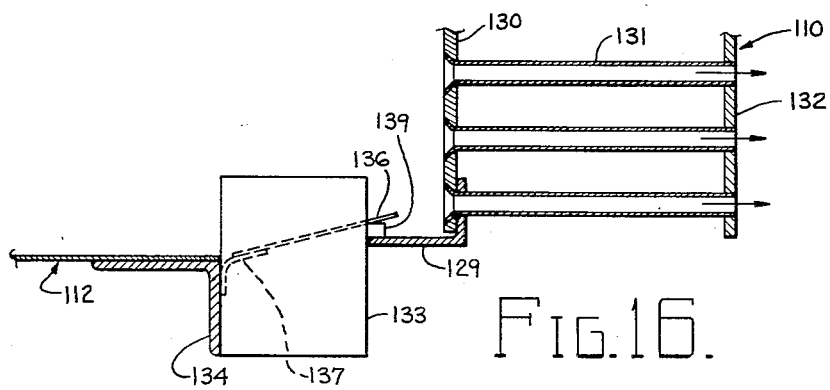
FIG. 16 is a horizontal fragmentary, sectional view, taken along the line 16—16 of FIG. 13.

In general, an apparatus embodying the invention comprises a glass carrying spider, generally indicated at 20, drive mechanism, generally indicated at 21, a generally toroidal furnace chamber, generally indicated at 22, which extends substantially less than 360°, and which thus has an open area for an operator's station, the open area being located at the bottom of FIGURE 1 and in the foreground of FIGURE 2, and a blast head mechanism, generally indicated at 23.

The spider 20 (FIGS. 1, 2 and 8) comprises a plurality of radially extending cantilever arms 25 rigidly braced by vertical struts 26 and connected to each other by horizontal members 27. The arms 25 are secured to a center support 28 rotatably journaled on the upper end of a center pedestal and in a top journal 30 supported by overlying girders 31 which extend inwardly from the upper ends of a corresponding number of beams 32, the beams being suitably braced so as to render the entire structure rigid.

In the embodiment of the invention illustrated in the drawings, the spider has ten radially extending arms 25 which are evenly spaced from each other angularly. This embodiment of the invention is thus adapted to treat ten individual sheets of glass with each complete rotation of the spider 20. The toroidal furnace chamber 22 in this embodiment of the invention extends circumferentially through six of the ten sections of the complete circle and the blast heads 23 occupy one of these sections. The open space at the front of the apparatus, therefore, consists of three of the ten sections. This leaves a single position in which each glass sheet is positioned just after it finishes its treatment, a position for the removal of treated glass sheets and a position for the insertion of untreated glass sheets into the glass carrying means supported by the arms 25 of the spider 20.

The drive mechanism 21 in the illustrated embodiment of the invention intermittently rotates the spider 20 onetenth of its complete rotation upon each excursion of the drive mechanism 21. The drive mechanism is inclusive of a timer which is initiated upon completion of each intermittent rotative movement of the spider 20 to hold the spider 20, and thus the glass sheets supported thereby, in each of the six furnace positions and the one blast head position for a predetermined period of time. After the expiration of this predetermined period of time, the timer energizes the drive mechanism for a subsequent excursion during which a new glass sheet is moved into the first furnace position, a completely heated glass sheet is moved out of the furnace chamber 22 and into the blast heads 23, and a tempered glass sheet is moved out of the blast heads 23 into the first open position.

The driving mechanism 21 (see FIGS. 3–7, inclusive) comprises a geneva mechanism which consists of a disk 33 carrying an actuator roller 34 which cooperates with a plurality of open ended channels 35, one of which is mounted upon the under side of each of the spider arms 25. The disk 33 is mounted on a vertical shaft 36 rotated through suitable gear means by a motor 37 (FIG. 2). The geneva actuator 34 is so spaced relative to the shaft 36 that as the disk 33 is rotated, the actuator 34 enters the open end of each of the channels 35 on the spider arms 25 and swings each spider arm 25 thus engaged angularly a distance of 36° during the rotation of the disk 33 and actuator 34 in a single excursion of the drive mechanism 21. The initiation of the excursion of the drive mechanism 21 is, as mentioned, under the control of a timer which is conventionally wired to the motor 37 and which energize the motor 37 to commence an excursion of the drive mechanism 21 after the predetermined interval of time during which each glass sheet is to be subjected to treatment at each of the six furnace and one blast head stations. The excursion of the drive mechanism 21 is terminated by a limit switch 38 positioned at the rear of the disk 33 with its actuator arm in line to be actuated by a trip finger 39 carried on the under side of the disk 33. When the switch 38 is tripped by the finger 39, the motor 37 is de-energized and the timer initiated to again interpose the predetermined period of delay.

The drive mechanism 21 not only functions in the manner just described to produce intermittent rotative movements of the spider 20 and thus to transport the glass sheets from position to position, but it also functions to open and close a pair of entrance and exit furnace doors 40 and 41, respectively. The two furnace doors 40 and 41 close vertical openings in generally radially extending end walls 42 and 43, respectively, of the furnace chamber 22. The exit opening in the exit end wall 43 is indicated in FIGURE 3 by the reference number 44 and a similar opening exists in the entrance end wall 42 although it is not shown in the drawings. Each of the doors 40 and 41 is hinged on a vertical rod extending upwardly along the outer side of its respective entrance or exit opening to and from the furnace chamber 22.

The mechanism for opening and closing the entrance and exit doors 40 and 41 comprises a pair of bifurcated arms 45 and 46 which are rigidly secured on associated sprocket wheels 47 and 48, respectively. The sprocket wheels 47 and 48, and thus the bifurcated arms 45 and 46, are mounted upon vertical shafts 49 and 50 carried by the same support members which carry the main drive mechanism 21, the shafts 49 and 50 being parallel to the main drive shaft 36. The bifurcated arms 45 and 46 are swung back and forth to open and close their respective doors 40 and 41 by the engagement of a door actuating roller 51 carried on the under side of the disk 33 with the arms 45 and 46. During the timed delay periods, the two doors 40 and 41 are closed and the roller 51 is positioned between the bifurcations of the arms 45 and 46 which are in alignment as illustrated in FIG. 3. The arms 45 and 46 are held in alignment against an adjustable stop 52.

When the excursion of the drive mechanism 21 is initiated, the roller 51 is rotated by the disk 33 in a counterclockwise direction. It immediately enters between the bifurcations of the arm 45 and starts to swing the arm 45 in clockwise direction, moving it from the position indicated in FIGURE 3 toward the position indicated in FIGURE 5. By comparing FIGURES 3 and 5, it will be seen that during this degree of rotation of the disk 33 the geneva actuator roller 34 has not yet entered the open end of the channel 35 on the spider arm indicated by reference number 25a. Therefore, the spider 20 has not yet commenced its rotative increment of movement. Swinging the arm 45 from the position of FIG. 3 to the position of FIG. 5 rotates its sprocket 47 in a clockwise direction and, through the medium of a chain 53 which is engaged with both of the sprockets 47 and 48, concurrently produces counterclockwise rotation of the sprockets 48 and arm 46. Thus, the arms 45 and 46 swing together at all times, although their directions of movement are opposite each other. The chain 53 is also engaged in a pair of door actuator sprockets 54 and 55 which are mounted upon the upper ends of vertical shafts 56 (FIG. 2) and 57. The vertical shafts 56 and 57 are journaled appropriately at their upper and lower ends, and near their lower ends carry crank levers 58 and 59 which are linked by connecting bars 60 and 61 to crank arms 62 and 63 that are rigidly attached to the hinge rods of the doors 40 and 41, respectively.

Movement of the two arms 45 and 46 from the position of FIGURE 3 to the position of FIGURE 5 and the resulting rotative movement of their respective sprockets 47 and 48, thus rotates the door sprockets 54 and 55 and through their crank levers, opens the two doors 40 and 41, swinging the door 40 in a counterclockwise direction and the door 41 in a clockwise dirction. The doors 40 and 41 are thus opened prior to the initiation of the rotative movement of the spider 20, so that they will not obstruct the entrance of a new glass sheet into the furnace chamber 22 or the exit of a heat treated glass sheet from the exit side of the furnace chamber 22.

The door actuating mechanism just described is provided with certain safety interlocks to prevent damage in the event of some malfunction of the apparatus or if the chain 53 were to break. Among these mechanisms, which are substantially identical for both doors 40 and 41, is a counterweight 64 (FIG. 2) connected by a chain 65 running over a pulley 66 to the door crank arm 62 of the door 40. A similar arrangement is also provided for the door 41. If the chain 53 breaks, the counterweight 64 and its counterpart on the opposite side of the apparatus swing the doors 40 and 41 to open position.

A circuit interlock is also provided by which the position of the doors 40 and 41 is sensed to prevent continuation of the excursion of the drive mechanism 21 in the event that the doors 40 and 41 are not fully open. This circuit interlock comprises a pair of limit switches, for example the switch 67 (FIG. 2), which is closed or opened as the case might be, depending upon the position of the door 40. A similar switch is located near the door crank 63 of the door 41.

When the disk 33 reaches the position shown in FIGURE 5, the doors 40 and 41 are swung almost all the way open and they reach this full open position when the drive mechanism 21 reaches the position illustrated in FIGURE 4. In this position of the mechanism, the door actuator roller 51 has reached the open end of the bifurcated arm 45 so that further rotation of the disk 33 produces no additional movement of the arm 45 beyond this fully open position. At this position of the drive mechanism 21, the geneva actuator roller 34 is just entering the open end of the channel 35 of the spider arm 25a.

During the timed interval between excursions of the drive mechanism 21 when the spider 20 and the glass sheets supported thereby are stationary, the spider 20 is locked in position. This spider lock mechanism is generally indicated in FIGURES 5, 6 and 7 by the reference number 68. The spider lock mechanism 68 includes a bell crank 69 having a long arm 70 on the end of which there is mounted a cam roller 71. The cam roller 71 rides the periphery of the disk 33. The disc 33 thus functions not only to carry the geneva actuator roller 34 and the door actuator roller 51, but also as a cam and is cut back over a substantial extent of its periphery to form a recessed cam surface 72 as can be seen by reference to FIGURE 5. The recessed cam surface 72 terminates in an abrupt rise 73 which engages the roller 71 of the bell crank 70 immediately after the door actuating arms 45 and 46 have reached fully open position. A short arm 74 of the bell crank 69 is pivotally connected to the end of a locking pin 75 which is slidable through a block 76 aligned with the closed outer ends of the channels 35 carried on the under sides of the spider arms 26. The closed ends of the channels 35 are bored to receive the locking pin 75.

When the cam roller 71 is riding the lower surface 72 of the disk 73, the bell crank 69 is in the position illustrated in FIGURES 5 and 7 and the locking pin 75 is thrust into the bore in the closed end of the respective channel 35. The spider 20 is thus locked against rotative movement during the opening movement of the doors 40 and 41 and the spider 20 is not unlocked until after the doors 40 and 41 have been swung fully open and the disk 33 has rotated sufficiently for the roller 71 to engage the rise 73 and to contact the high surface 77 of the disk 33. The bell crank 69 is normally urged in counterclockwise direction by a spring (not shown). Movement of the bell crank 69 in a clockwise direction, i.e., from the position illustrated in FIGURE 5 to the position illustrated in FIGURE 6, withdraws the locking pin 75, freeing the spider 20 and actuating a circuit interlock switch 78 which stops the drive mechanism 21 unless the spider 20 is unlocked.

After the mechanism has moved beyond the position indicated in FIGURE 4 and the bell crank 69 has swung to unlock the spider 20, the geneva actuator roller 34 enters the channel 35 of the spider arm 25a (FIG. 4). Continued rotation of the disk 33 produces movement from the position of FIGURE 4 to the position of FIGURE 6 and then to the position of FIGURE 7. Just before reaching the position of FIGURE 7, the cam roller 71 drops off the surface 77 of the disk 33 and the geneva actuator roller 34 withdraws from the end of the channel 35. The spider arm 25a has thus been moved to locking position and the bell crank 69 again thrusts the stop pin 75 inwardly into the bore in the closed end of the channel 35 of the arm 25a. Immediately thereafter, the door actuator roller 51 enters the open end of the bifurcated arm 46 (FIG. 7) and continued rotation of the disk 33 and the door actuator roller 51, swings the door arm 46 in a clockwise direction and, through the engagement of the door chain 53 and the door linkages, closes the doors 40 and 41, restoring the apparatus to the position shown in FIGURE 3 with the switch 38 being actuated by the finger 39 to terminate the excursion of the drive mechanism 21 and initiate the controlled timer period. As can best be seen by reference to FIGURE 7, completion of a single excursion of the drive mechanism 21 has moved one of the spider arms, i.e., that arm indicated by the reference number 25a, 36° from the position shown in FIGURES 3 and 5 to the position shown in FIGURE 7, and a next successive arm indicated by the reference number 25b has been moved into position so that its open ended channel 35 will be next engaged by the geneva actuator roller 34.

The furnace chamber 22, as briefly mentioned above, is generally toroidal in shape and comprises generally circular inner and outer walls 85 and 86 which extend vertically and are spaced radially from each other. The walls 85 and 86, though spoken of herein as being circular, are shown in the illustrated embodiment as being straight and extending as chords of concentric circles, inasmuch as the particular furnace chamber 22 illustrated is not truly circular nor truly toroidal, but is instead a decagon. Because the particular geometric configuration of the furnace chamber 22 is not material, it being required only to have a shape such that a glass sheet may be moved from end to end along a circular path, it will, nevertheless, be referred to as "generally circular" or "toroidal" to emphasize the requirement. The furnace chamber 22 has a roof 87 and a floor 88. The side walls 85 and 86, roof 87 and floor 88 are all fabricated from refractory material suitably encased with structural plates and beams and forming a generally toroidal chamber in which the glass sheets are heat treated. The roof 87 has a centrally located, generally circular slot opening into the interior of the chamber 22. The end walls 42 and 43 of the furnace chamber 22 extend generally radially and close the ends of the chamber 22. The roof slot 89 is aligned with the vertical openings in the end walls 42 and 43, for example the opening 44 (FIG. 3).

As has been explained, in the embodiment of the invention shown in the drawings, the furnace chamber 22 extends circumferentially over six of the ten divisions of the apparatus. These six divisions constitute three furnace zones and these zones are indicated in FIGURE 1 as Zone 1, Zone 2 and Zone 3. In the embodiment of the invention illustrated, Zone 1 of the furnace is maintained at a temperature higher than Zone 2, and Zone 2 maintained at a temperature higher than Zone 3. Each of the zones of the furnace is independently heated at its respective controlled temperature by a plurality of gas burners 90 which are connected to a main gas line 91 by headers 92 and distribution pipes 93. In FIGURES 1 and 8, an attempt has been made to indicate the respective temperatures of Zones 1, 2 and 3 by slight differentials in the sizes of the headers 92 and distribution pipes 93 shown as leading to the numerous burners 90 in the Zones 1, 2 and 3. Particular temperatures within the Zones 1, 2 and 3, are, of course, automatically controlled by suitable thermostatic means (not shown or described herein).

The ends of the spider arms 25 (FIGS. 2, 8, 9–11) are connected to each other by horizontal braces 100 from which depend a plurality of struts 101 and glass support bars 102. The glass support bars 102 extend as chords of a circle the radius of which generally defines the center of the roof slot 89. Glass sheets are supported from the bars 102 by tongs 103 (FIG. 8), two sheets indicated by reference numbers 104 being shown in suspended position in that figure. The sides of the roof slot 89 are defined by upwardly extending slides 105 (FIG. 11). Each of the struts 101 is provided with support fingers 106 for carrying one of a plurality of shingled slot closure plates 107. Each of the plates 107 has a raised front end 108 which overlies the rear end of the next preceding plate 107 and each of the plates 107 has a generally rectangular opening which loosely fits over the strut 101 so that the plates 107 may rock slightly relative to the struts 101. The plates 107 are loosely attached to each other by large headed rivets 109 extending through over-size holes in the front ends 108 and rear ends of preceding plates 107. The plates 107 slide along on the upper edges of the slides 105. As the respective plates 107 slide off of the ends of the slides 105 at the exit end of the furnace chamber 22, they are held up in position by the support fingers 106 and the rivets 109 and as each of them moves around and onto the entrance side of the furnace chamber 22 the next preceding plate 107 causes each one to lift slightly and to slide onto and along the slides 105. The plates 107 thus act to close the roof slot 89 around the glass support braces 101 which extend through the plates 107 and slot 89 into the interior of the furnace for supporting the glass carrying bars 102, the tongs 103 thereon and the glass plates carried thereby.

The blast head mechanism 23 consists of two opposed blast heads 110 and 111 and their associated mechanism and is shown in FIGS. 12–16. The blast head mechanism 23 is located just beyond the exit end of the furnace chamber 22 and spaced one increment of spider movement therefrom so that each sheet of glass is moved into position between the blast heads 110 and 111 at the end of the rotative increment of movement which carries it out of the exit end of the furnace chamber 22 and is held in position between the blast heads 110 and 111 for the period of time determined by the timer which is included in the drive mechanism.

Each of the blast heads 110 and 111 is mounted across the front of a plenum chamber 112 or 113, respectively, and each of the chambers 112 and 113 is connected by suitable duct work 114 and 115 to an air conduit 116 leading from a source of air under pressure, for example a large capacity air compressor. Each of the blast heads comprises a generally rectangular frame 117 (FIG. 13) mounted by four pillow blocks 118 on four cranks 119 which are in turn carried by rotary counterbalanced disks 120 that are fixed on the ends of shafts 121 carried by heavy stationary frames 122. A blast head motor 123 is connected by chains and sprockets to rotate a driving shaft 124 and the shaft 124 is connected to each blast head frame 117 by one of a pair of drive chains 125 and sprockets 126 to rotate a lower one of the shafts 121, as indicated by the reference number 127 in FIGURE 12. Rotation of the shaft 127 and the respective one of the cranks 119, produces synchronized oscillatory movement of the two blast heads 110 and 111 across the faces of their respective plenum chambers 112 and 113 and relative to a sheet of glass indicated by the reference number 128 which is suspended between the blast heads 110 and 111. The motor 123 is energized separately from the main drive mechanism 21 so that when the machine is in operation the blast heads 110 and 111 constantly oscillate across their respective plenum chambers 112 and 113.

Each of the blast heads 110 and 111 comprises an open rectangular frame 129 (FIGS. 15 and 16) to which a jet tube mounting plate 130 is fixedly secured, for example by welding. The plate 130 is imperforate except for countersunk apertures drilled therethrough in a reticulated pattern for the reception of the flared ends of a corresponding number of jet tubes 131. The jet tubes 131 are braced, soldered or otherwise affixed in place in the counterbored perforations in the plate 130 and the front ends of the tubes 131 are secured in and spaced relative to each other by a skeleton plate 132 to give the assembly rigidity. Flaring the high pressure or entrance ends of the jet tubes 131 greatly increases the efficiency of the air flow through the jet tubes from the plenum chamber, across the front end of which the jet tubes 131 are oscillated by the mechanism just described.

A corner block 133 is fixedly mounted on each of the stationary frames 122 at each corner of the blast head frame 129. As can best be seen by reference to FIGURE 16, the corners of the blast head frame 129 slide on the front faces of the blocks 133 during the oscillation of the blast heads 110 and 111. The space between angle bars 134, which form the front edges of the respective plenum chambers 112 and 113, and the rear edges of the blast head frame 129 is closed on all four sides of each of the blast heads 110 and 111 by several sealing flaps, for example the horizontally extending flap 135 illustrated in FIG. 15 and the vertically extending flap 136 shown in FIG. 16. The two vertical sealing flaps 136 at the opposite sides of each of the blast heads 110 and 111, extend vertically between the lower side of the upper corner block 133 and the upper side of the lower corner block 133 at that side of the blast head 110 or 111. Similarly, the horizontal sealing flaps 135 at the top and bottom of each of the blast heads 110 and 111 extend between the inner sides of the two upper corner blocks 133 or the two lower corner blocks 133, respectively. Each of the sealing flaps 135 and 136 is flexibly hinged to the forward faces of the angle frame members 134, for example by cemented leather strips 137 (FIG. 16), so that the respective flap 135 or 136 can swing back and forth. Whatever means for mounting the sealing flaps 135 or 136 is employed, it must be both freely flexible and impervious to air. The front edges of the sealing flaps 135 or 136 overlap the rear edges of the blast head frame 129 and bear against friction bars 138 or 139, respectively. The ends of the sealing flaps 135 and 136 oscillate against the respective surfaces of the corner blocks 133 which are suitably coated with a mastic compound as are the faces of the sealing blocks 133 against which the rear edges of the blast head frames 129 bear in sliding contact. With respect to FIGURE 15, if vertical reciprocation of the fragment of the blast head 110 shown therein is envisioned, it will be seen that the sealing flap 135 will oscillate about its hinge at its left end end in sliding contact with the bar 138. Similarly, in FIGURE 16, reciprocation of the fragment of the blast head 110, i.e., horizontal components of movement of the blast head 110 or 111, will result in oscillating the sealing flap 136. When the blast heads 110 and 111 are oscillated and air under pressure is present in the plenum chambers 112 or 113, the sealing flaps 135 and 136 and the corner blocks 133 cooperating with the blast head frames 129 and friction bars 138 and 139 provide complete air seals around the perimeters of the blast heads 110 and 111. Air under pressure is, therefore, allowed to escape from the plenum chambers 112 and 113 only through the jet tubes 131 of the two blast heads 110 and 111.

Because of the large volume of air which is directed on the glass sheet 128 from the blast heads 110 or 111 in order to temper the sheet, it is necessary to obviate the possibility of this cold air entering the exit end of the furnace chamber 22 when its door 41 is open. Inasmuch as the blast head mechanisms have considerable mass and thus considerable inertia, it is impractical to stop their oscillation during the rotative movement of the spider 20 and the time when the door 41 is open. Therefore, as mentioned above, the oscillatory movement of the blast heads 110 and 111 is continuous. However, in order to obviate the entrance of cold air into the furnace chamber 22 whenever the exit door 41 is open, the air supply to the blast heads 110 and 111 is automatically shut off.

Mechanism for controlling air flow to the blast heads 110 and 111 is illustrated in FIGURES 12 and 14. The exit door actuating sprocket 55 which is rotated by the door chain 53, as described above, carries a second crank arm 140 (FIG. 14) which is connected by a pull rod 141 to a shutter actuating crank 142. The crank 142 is pinned on the end of a shaft 143 which actuates a multi-vane shutter 144 (FIG. 12) that is located across the conduit 116 leading to the air duct works 114 and 115. The multi-vane shutter 144 is a quick acting shutter so that as soon as the exit door 41 starts to open the shutter 144 is closed and air flow out of the blast heads 110 and 111 is stopped. The air remains shut off until the exit door 41 returns to closed position, as shown in FIGURE 14, and the shutter 144 is opened by return movement of the arm 140, rod 141, crank 142 and shaft 143.

We claim:
1. Apparatus for heat treating flat glass sheets comprising, in combination, a rotary spider mounted on a central pedestal and having radially extending arms, a plurality of means supported by said arms at a standard distance from said pedestal for dependingly carrying glass sheets to be heat treated, a generally toroidal heating chamber extending circumferentially less than 360° and having radially spaced, continuous inner and outer vertical side walls, a closed bottom, a roof and generally radially extending, vertical end walls, the roof of said chamber having a continuous slot opening into the interior of said chamber and extending around said chamber centrally between said vertical side walls and along the path of movement of said glass carrying means with said glass carrying means extending downwardly through the slot for supporting glass sheets interiorly of said furnace chamber, each of said end walls having a vertical opening therein aligned with the slot in the roof of said chamber, a door for each of the openings in said end walls mounted on the exterior of the respective one of said end walls and each being movable between a position in which the respective opening is unobstructed for the passage of a glass sheet therethrough and a position closing such opening, and a single drive mechanism for intermittently rotating said spider between evenly circumferentially spaced positions and including direct mechanical linkage connected to both of said doors for simultaneously opening said doors prior to movement of said spider and for simultaneously closing said doors subsequent to movement of said spider.

2. Apparatus according to claim 1 and a blast head mechanism positioned outside the exit end of said chamber at a distance therefrom and aligned relative thereto so that each sheet of glass is moved into said blast head mechanism by the intermittent rotation of said spider immediately after being moved out of said chamber and a control for said blast head to admit air under pressure thereto after each glass sheet is positioned therein and to cut off such air during rotative movement of the spider.

3. In an apparatus according to claim 1 and an air blast head positioned adjacent the exit end of the furnace, a source of compressed air for said blast head, and air control means actuated by that one of the doors at the exit end of said furnace for shutting off the air from said blast head when said exit door is open.

4. A glass tempering apparatus comprising, in combination, a furnace chamber of generally toroidal shape with a segment removed, said chamber having radially spaced concentric side walls, a roof and generally radially extending entrance and exit end walls, said roof having a centrally located circumferentially extending slot opening into the interior of said chamber and said end walls having entrance and exit openings, respectively, aligned with such slot, a glass carrying spider concentrically mounted relative to said chamber and having circumferentially spaced glass sheet carriers depending from the arms of said spider at a radial distance aligned with the slot in said roof and the openings in said end walls, said glass carriers being spaced and aligned for entering the openings and extending through the slot for supporting glass sheets interiorly of said furnace chamber, a door for each of said end wall openings mounted on said end wall adjacent such opening, a vertically oriented pair of air blast heads located adjacent the exit end of said chamber for chilling glass plates moved therebetween, and an intermittent drive mechanism for rotating said spider in successive movements from position to position for moving glass sheets suspended from said glass carriers into and through said chamber, out of said chamber into the space between said blast heads, and away from said blast heads, in successive movements and for opening said doors prior to each of said movements and closing said doors subsequent to each of said movements.

5. In a glass tempering apparatus the improvement comprising, in combination, a pair of horizontally spaced, upright frames mounted on opposite sides of the path of movement of the glass sheets, manifolding forming plenum chambers on the outer sides of said frames, a source of air under pressure leading to said plenum chambers, a blast head mounted eccentrically on horizontal, transverse, parallel axes for oscillation across the front of each of said frames, a sealing flap extending along each of the horizontal and vertical edges of said frame and the corresponding edge of said blast head, each of said flaps being hinged to one of said frame and blast head edges and slidingly engaged with the other of said corresponding edges, and a plurality of blast nozzles extending through each of said blast heads away from the associated one of said chambers for directing air from said plenum chamber onto a sheet of glass between said blast heads.

6. A glass tempering apparatus according to claim 5 in which each of said blast heads comprises an otherwise imperforate closure plate extending across said blast head and through which said blast nozzles extend, the rear ends of said blast nozzles being open and exposed in the associated one of said plenum chambers.

7. In a glass tempering apparatus having a generally toroidal heating chamber extending less than 360° and defined by radially spaced inner and outer walls, a roof and radially extending, vertical end walls, a tempering station located adjacent the exit end of said heating chamber and a rotary spider mounted on a central pedestal and having a plurality of radial arms extending outwardly to said heating chamber, the improvement comprising, in combination, a continuous circumferentially extending slot opening into said heating chamber and extending through said end walls, means supported on the ends of said spider arms and extending into said heating chamber through said slot for supporting glass sheets within said chamber, an entrance opening in one of said end walls of a size suitable for the passage therethrough of said support means and glass sheets supported thereby and connected to said circumferential slot, an exit opening of similar size and shape in the other of said end walls, a door mounted on the exterior of each of said end walls and movable between a position closing the opening in said end wall and a position not obstructing the opening in said end walls, and a single drive mechanism for intermittently rotating said spider in even successive angular movements of sufficient distance to move a single sheet of glass into or out of said heating chamber and said tempering station and for opening and closing said doors before and after, respectively, such movements of said spider, said drive mechanism comprising, a common actuator, power means for driving said actuator through a single excursion, a door opening lever engaged by said actuator during only the beginning portion of an excursion, a door closing lever engaged by said actuator during only an end portion of an excursion, linkage connecting both of said levers to both of said doors for simultaneous movement of both of said doors during engagement of either of said levers by said actuator, and cooperating means on said actuator and on said spider engaged by movement of said actuator during only the intermediate portion of an excursion for rotating said spider through one of said angular movements thereof.

References Cited in the file of this patent

UNITED STATES PATENTS

| | | |
|---|---|---|
| 884,427 | Standish | Apr. 14, 1908 |
| 1,603,368 | Weil | Oct. 19, 1926 |
| 1,919,650 | Hagan | July 25, 1933 |
| 2,251,106 | Black et al. | July 29, 1941 |
| 2,525,407 | Frei | Oct. 10, 1950 |
| 2,696,082 | Fouron et al. | Dec. 7, 1954 |
| 2,841,925 | McMaster | July 8, 1958 |
| 2,876,593 | Neuhausen | Mar. 10, 1959 |
| 2,917,871 | Atkeson | Dec. 22, 1959 |
| 3,015,910 | McMaster et al. | Jan. 9, 1962 |

FOREIGN PATENTS

| | | |
|---|---|---|
| 563,138 | Great Britain | Aug. 1, 1944 |